United States Patent [19]

Shiroki et al.

[11] 4,039,970
[45] Aug. 2, 1977

[54] SOLID STATE LASER DEVICE WITH LIGHT FILTER

[75] Inventors: Ken-ichi Shiroki; Katsumi Mori; Yasuhiko Kuwano; Seiichi Saito, all of Tokyo, Japan

[73] Assignee: Nippon Electric Company, Ltd., Tokyo, Japan

[21] Appl. No.: 631,218

[22] Filed: Nov. 12, 1975

Related U.S. Application Data

[63] Continuation of Ser. No. 452,523, March 19, 1974, abandoned.

[30] Foreign Application Priority Data

Mar. 23, 1973 Japan .................................. 48-33787

[51] Int. Cl.$^2$ ............................................. H01S 3/092
[52] U.S. Cl. .......................... 331/94.5 F; 331/94.5 P
[58] Field of Search ................................... 331/94.5

[56] References Cited

U.S. PATENT DOCUMENTS

| | | | |
|---|---|---|---|
| 3,614,662 | 10/1971 | Monchamp et al. | 331/94.5 F |
| 3,634,779 | 1/1972 | Crow | 331/94.5 P |

OTHER PUBLICATIONS

Handbook of Lasers, The Chemical Rubber Co., 1971, p. 390.

*Primary Examiner*—William L. Sikes
*Attorney, Agent, or Firm*—Hopgood, Calimafde, Kalil, Blaustein & Lieberman

[57] ABSTRACT

A laser device includes a solid state laser element consisting of a yttrium aluminate crystal and a source of pumping light. A light filter which intercepts and removes pumping light components having wave-lengths below about 5,000A is disposed between the laser element and the light source. The removal of these selected higher frequency components lowers the oscillation threshold value and increases the laser output.

6 Claims, 4 Drawing Figures

SOLID STATE LASER DEVICE WITH LIGHT FILTER

PRIOR APPLICATIONS

This is a continuation of application Ser. No. 452,523 of the same title filed on Mar. 19, 1974 and now abandoned.

BACKGROUND OF THE INVENTION

The present invention relates to a solid state laser device and, more particularly, to a solid state laser device including a light filter inserted between the pumping light source and the solid state laser element.

A solid state laser device having a solid state laser element the base of which is made of a yttrium aluminate crystal, is known to be useful because the oscillation light exhibits linear polarization due to the base crystal belonging to the orthorhombic system.

However, this type of laser device has not been put to practical use because the life of the base material is not long enough and the oscillation threshhold level, i.e., the minimum pumping level required to bring about laser oscillation, tends to rise with the lapse of time.

SUMMARY OF THE INVENTION

Upon analyzing the relationship between the wavelength of the pumping light and the oscillation output and between the wave-length of the pumping light and the oscillation threshhold value, it has been found that there is a previously unappreciated close relationship between these factors. More specifically, the threshhold value and the laser output vary appreciably depending on the spectrum distribution of the pumping light rays. This indicates that laser efficiency can be improved by optimizing the wave-length distribution. The present invention is based on this principle.

A laser device according to the invention includes a solid state laser element consisting of a yttrium aluminate ($YAlO_3$) crystal and a source of pumping light. A light filter means for intercepting and removing pumping light components having wave-lengths below about 5,000A is disposed between the laser element and the light source. The removal of these selected higher frequency components lowers the oscillation threshhold value and increases the laser output.

BRIEF DESCRIPTION OF THE DRAWINGS

The invention is described in greater detail below with reference to the accompanying drawings, in which.

DESCRIPTION OF THE PREFERRED EMBODIMENT

Figure 1A:
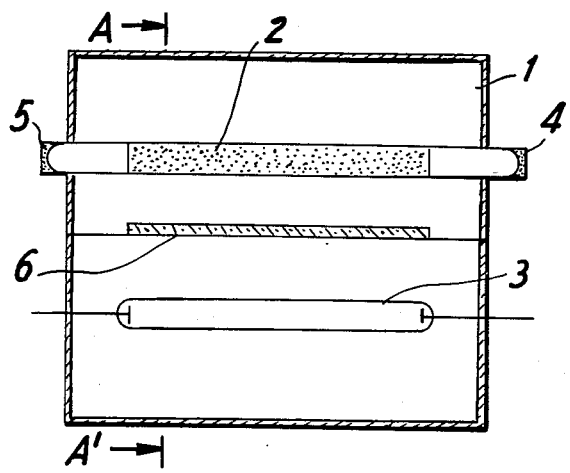
FIGS. 1a and 1b schematically show the longitudinal and axial cross-sectional view of a laser device embodying the invention.
Figure 1B:
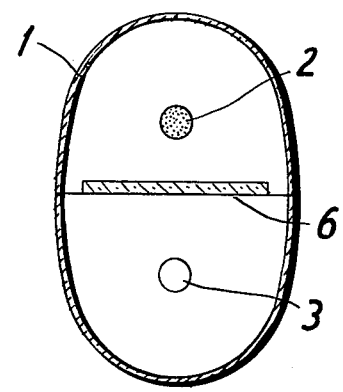

In FIG. 1, the construction of a laser device embodying the present invention is illustrated schematically. The numeral 1 denotes a light condenser with its internal cross section being elliptical across A-A' or any plane parallel to A-A'. The inside of the condenser 1 is plated with gold. A cylindrical laser element 2, 3 mm in diameter and 50 mm in length, is installed at one focal point of the elliptical condenser, and a xenon flash lamp 3 connected to a power source is positional at the other focal point thereof. The laser element 2 is composed of an yttrium aluminate ($YAlO_3$) crystal containing 1 atomic percent of neodymium ion ($Nd^{3+}$) with its longitudinal direction parallel to the $b$-axis, and has its ends polished to parallel planes. This $YAlO_3$ and $Nd^3$ laser element has a pumping band of 3500A to 9000A as reported by M. J. Weber, et al, Czochralski Grown Laser Materials, Tech, Rep. AFML-TR-70-258, 1970. The lamp and the laser element are located at the opposite focal points in order to concentrate the light from the lamp at the laser element with a maximum efficiency. The numerals 4 and 5 denote reflecting mirrors which form a light resonator. These mirrors of spherical shape and 3 m in curvature are disposed on both sides, respectively, of the elongated laser element. The line connecting the two spherical centers passes approximately through the center axis of the laser element and is parallel to its longitudinal axis. The numeral 6 stands for a light filter means which plays an important role in the device of this invention. Almost all the light from the lamp 3 is transmitted through this filter 6 before reaching the laser element 2.

Figure 2:
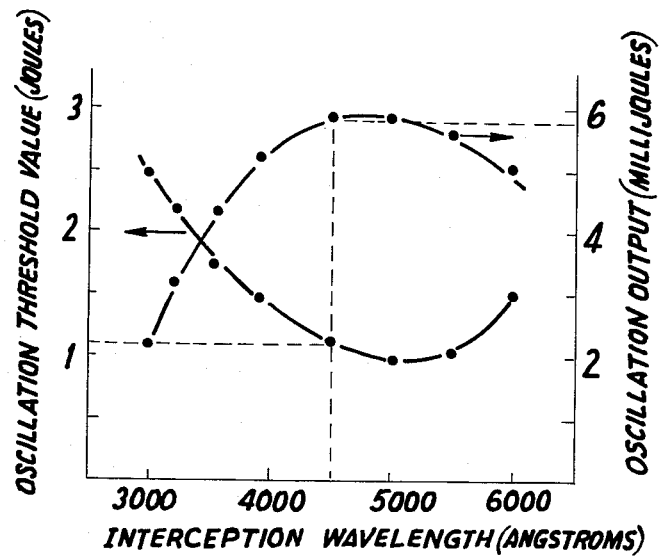
FIGS. 2 and 3 are similar graphical displays of changes in oscillation threshold energy level and oscillation output, plotted against wavelength, FIG. 2 being applicable to the observed laser performance of an yttrium-aluminate crystal containing neodymium, and FIG. 3 being applicable to another yttrium-aluminate crystal with an erbium-ion content.

The reflection factors of the mirrors 4 and 5 facing the laser element 2 are 99.9% and 95.0%, respectively, with respect to light with a wave-length of 1.0795 microns. A pulsed electric power input is supplied to the lamp. When this electric power input is increased, a laser oscillation starts at an electric input above a predetermined level. The occurrence of laser oscillation can be sensed by a detector such as a solar cell or a thermocouple placed outside the reflecting mirror 5 having a reflection factor of 95.0%. The pulsed electric input at which a laser oscillation starts is the oscillation threshhold value. The laser oscillation output increases with an increasing applied pulsed electric input. This output can be sensed by a detector. FIG. 2 shows the laser oscillation threshhold values and the output values at an input of 10 joules, measured with various light filters 6. In FIG. 2, the ordinate at left-hand side stands for oscillation threshhold values, and the ordinate at right-hand side stands for oscillation output values at an input of 10 joules. The abscissa indicates the upper limit of the wavelength to be intercepted by the filter 6. In other words, the excitation light rays with wave-lengths shorter than the upper limit wavelength are intercepted. When, for example, the wavelength component below 4,500A is intercepted as indicated by the dotted line, then the laser oscillation threshhold value is 1.1 joules, and the output is 5.8 millijoules at an input of 10 joules.

From FIG. 2, it is apparent that the oscillation threshhold value is minimized and the oscillation output is maximized when the wave-length components below 5,000A are intercepted and removed from the pumping light. This phenomenon has been experimentally observed at different mirror reflection factors and at different pulse widths of the pulsed pumping light. In the example described here, the laser element was of yttrium aluminate crystal containing neodymium, having its longitudinal direction parallel with the $b$-axis. Alternatively, a laser element havings its longitudinal direction parallel with the $c$-axis may be used. This laser element, in an experiment, was stimulated against a wave-length of 1.0645 microns, resulting in a most desirable oscillation threshhold value and laser output when the wave-length component below 5,000A was removed. Another experiment was carried out by using a Brewster plate inserted between the laser element and the reflecting mirror. The placement of the Brewster plate was varied in terms of angle and direction, and laser oscillation along both the $b$-axis and $c$-axis at wavelengths of 1.0645, 1.0729, 1.0795, 1.0909, 1.0989, 1.3391, and 1.3411 microns were observed. This experiment yielded the most desirable results, as in FIG. 2, when the wave-length components below 5,000A were intercepted and removed.

Figure 3:
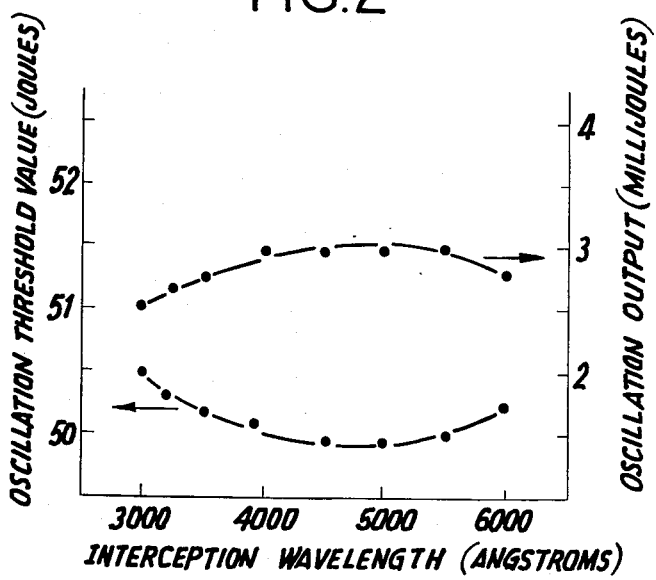

The above example relates to a laser element using a yttrium aluminate crystal which contains neodymium as a laser-active ion. FIG. 3 shows the results of the experiment on a laser element using a yttrium aluminate crystal which contains 0.5 atomic percent erbium ion ($Er^{3+}$).

The structure of the laser device used in this experiment was the same as that shown in FIG. 1, and the oscillation wave-length was 1.663 microns. The dependency of the laser oscillation threshhold value and the laser oscillation output (at an input of 100 joules) upon the wave-length of the pumping light was observed to be not as high as in the laser element using yttrium aluminate crystal containing neodymium. However, it was found in this experiment as well that the laser efficiency was best when the wave-length component below 5,000A, was removed from the pumping light.

From the above experiments it may be concluded that the yttrium aluminate crystal, when irradiated with light with wave-lengths below 5,000A, gives rise to extra light absorption being so wide in the range of wave-lengths that the laser oscillation threshhold value is raised and the output is lowered. It is evident that the interception of the wave-length components of the pumping light below 5,000A can serve to improve the laser efficiency.

In the foregoing examples, a xenon flash lamp was used to stimulate laser electrons. Instead of this xenon flash lamp, other suitable lamps such as krypton arc lamps and tungsten iodine lamps may be used, and the same desirable results as in the foregoing examples can be obtained. The light filter described in the above examples is of colored glass manufactured by Tokyo Shibaura Electric Co., Ltd., corresponding model nos. and interception wave-lengths being as follows:

UV-29:3000A
UV-35:3500A
UV-39:4000A
V-Y45:4500A
V-Y50:5000A
V-O55:5500A
V-R60:6000A

Instead of these types of light filters, any suitable light filter capable of intercepting or absorbing wave-length components below 5000A out of the pumping light may be used. Such filter may assume any suitable shape such as a cylindrical structure installable on the laser element or the pumping lamp.

Although the invention has been described above with reference to specific embodiments, many modifications and variations therein will readily occur to those skilled in the art. All such modifications and variations are intended to be included within the scope of the present invention.

We claim:

1. An improved laser device comprising a solid state laser element consisting of a yttrium aluminate crystal having a pumping band defined by predetermined lower and upper wavelengths, a source of pumping light, and a light filter means for intercepting and removing pumping light components having wavelengths below about 5,000A at least some of which are above the lower wavelength limit of the pumping band, the filter means being disposed between the laser element and the light source, whereby the removal of higher frequency components of the pumping light results in a lower oscillation threshhold and increased laser output.

2. The laser device of claim 1, further comprising a light condenser having an elliptical cross-section, the laser element and the light source being located at the foci of said ellipse.

3. The laser device of claim 1, wherein the laser element contains approximately one atomic percent neodymium ions.

4. The laser device of claim 1, wherein the laser element contains approximately 0.5 atomic percent erbium ions.

5. An improved laser device comprising a solid state laser element consisting of a yttrium aluminate crystal having a pumping band extending from about 3,500A to 9,000A, a source of pumping light, and a light filter means for intercepting and removing pumping light components having wavelengths below about 5,000A, the filter means being disposed between the laser element and the light sourcce, whereby the removal of higher frequency components of the pumping light results in a lower oscillation threshhold and increased laser output.

6. The laser device of claim 5, wherein the laser element contains about one atomic weight of neodymium ion.